United States Patent [19]

Aoki

[11] Patent Number: 5,337,292
[45] Date of Patent: Aug. 9, 1994

[54] RECORDING/REPRODUCING APPARATUS WITH REMOTE CONTROLLER

[75] Inventor: Harumi Aoki, Iruma, Japan

[73] Assignee: Asahi Kogaku Kogyo Kabushiki Kaisha, Tokyo, Japan

[21] Appl. No.: 835,074

[22] Filed: Feb. 18, 1992

Related U.S. Application Data

[63] Continuation of Ser. No. 567,073, Aug. 14, 1990, abandoned.

[30] Foreign Application Priority Data

Aug. 16, 1989 [JP] Japan .................. 1-211062

[51] Int. Cl.⁵ .............................................. H04B 1/20
[52] U.S. Cl. .......................................... 369/2; 369/5; 369/19; 369/24
[58] Field of Search ............... 369/2, 5, 19, 24, 292

[56] References Cited

U.S. PATENT DOCUMENTS

| | | | |
|---|---|---|---|
| 3,233,045 | 2/1966 | Beer | 369/24 |
| 3,797,037 | 3/1974 | Kolpek | 360/72 |
| 3,910,584 | 10/1975 | Hilton | 369/24 |
| 3,922,641 | 11/1975 | Gates, Jr. | 369/2 |
| 3,974,338 | 8/1976 | Luzier | 369/2 |
| 4,152,732 | 5/1979 | Weis | 369/24 |
| 4,371,750 | 2/1983 | Markley | 179/1 VL |
| 4,447,837 | 5/1984 | Hirata | 369/24 |
| 4,525,820 | 6/1985 | Euoki | 369/2 |
| 4,807,051 | 2/1989 | Ogura | 369/2 |
| 4,901,160 | 2/1990 | Kinoshita | 358/335 |
| 4,982,291 | 1/1991 | Kurahashi | 358/335 |
| 5,014,136 | 5/1991 | Sakai et al. | 358/341 |

FOREIGN PATENT DOCUMENTS

| | | |
|---|---|---|
| 0186883 | 7/1986 | European Pat. Off. . |
| 2131406 | 1/1972 | Fed. Rep. of Germany . |
| 3737281 | 4/1989 | Fed. Rep. of Germany . |
| 2428881 | 1/1980 | France . |
| 1115276 | 5/1989 | Japan . |
| 2023907 | 1/0380 | United Kingdom . |
| 1093608 | 12/1967 | United Kingdom . |

OTHER PUBLICATIONS

English Abstract of JP-1115276 May 1989.

*Primary Examiner*—Robert J. Pascal
*Assistant Examiner*—Reginald A. Ratliff
*Attorney, Agent, or Firm*—Sandler, Greenblum & Bernstein

[57] ABSTRACT

A recording/reproducing apparatus is disclosed that is capable of recording an inputted audio signal onto a recording medium. A controlling device is provided which is capable of remote-controlling at least a recording operation of the recording/reproducing apparatus. A microphone is provided on the controlling device for picking up sound waves and converting them into audio signals to be input into the recording/reproducing device, and at least one audio source is provided for generating an audio signal to be input into the recording/reproducing apparatus. A selection switch is further provided for selecting either the microphone or the audio source. The selection switch is provided on the controlling device and a control circuit is utilized for controlling the apparatus to receive the audio signal from either one of the microphone and the audio source.

20 Claims, 5 Drawing Sheets

RECORDING/REPRODUCING APPARATUS WITH REMOTE CONTROLLER

This application is a continuation of application Ser. No. 07/567,073, filed Aug. 14, 1990, now abandoned.

BACKGROUND OF THE INVENTION

The present invention relates to a recording/reproducing apparatus having a controlling device for remote-controlling the apparatus. The apparatus is capable of receiving an AV (audio/video) signal from one of plurality of AV signal sources and recording it onto a recording medium.

A recording/reproducing apparatus is known for recording and reproducing video signals corresponding to still images photographed by electronic still cameras. The recording/reproducing apparatus is designed to record video signals on a magnetic disk via a magnetic head, and to reproduce the video signals recorded on the magnetic disk so that the image can be seen on a display.

Recently, electronic still cameras capable of recording audio signals as well as video signals have been proposed. With the appearance of such electronic still cameras, the recording/reproducing apparatus provided with the audio signal processing circuit has been developed. By using such an apparatus, an audio signal as well as a video signal can be recorded on a magnetic disk. The sound is reproduced together with the still image by reproducing both the audio and video signals. Further, the recording/reproducing apparatus provided with a remote controller for remote-controlling the operations of the main recording/reproducing apparatus is also known.

The recording/reproducing apparatus is equipped with an audio signal processing circuit, a video signal processing circuit, a recording/reproducing circuit and other similar circuitry in its main apparatus for recording and reproducing audio and image signals. Typically, a remote controller is provided having a transmitting circuit for controlling the operation of the audio signal processing circuit, the video signal processing circuit, the recording/reproducing circuit and other similar circuitry which may be electrically connected to the main apparatus.

In the recording/reproducing apparatus discussed above, however, the microphone and the remote controller have to be operated individually because they are separately arranged. This arrangement is extremely inconvenient and therefore has an causes adverse effect on operability.

SUMMARY OF THE INVENTION

It is therefore an object of the present invention to provide an improved recording/reproducing apparatus that is excellent in operability. The switches installed in the remote controller can be used for not only operating the microphone but also for remote-controlling the operation of the main apparatus.

To perform the above object, according to the invention, there is provided a recording/reproducing apparatus capable of recording inputted audio signal onto a recording medium. The apparatus includes:

a controlling device capable of remote-controlling at least a recording operation of the recording/reproducing apparatus.

a microphone is provided on the controlling device for picking up sound waves and converting them into audio signals to be recorded.

a first audio signal receiving device is provided for receiving the audio signal generated by the microphone, and a second audio signal receiving device is provided for receiving the audio signal except for the audio signal which is generated by the microphone.

a select device is provided for selecting one of the first and second audio signal receiving devices, the select mechanism being provided on the controlling device, and a control device is also provided for electrically connecting one of the first and second audio signal receiving devices, which is selected by the select device, to the apparatus.

According to another aspect of the invention, there is provided a method of recording an audio signal onto a recording medium, the audio signal being received by one of a plurality of audio signal receiving devices provided in a recording/reproducing apparatus. The apparatus is provided with a memory for storing the audio signal received by one of a plurality of audio signal receiving devices and, a controlling device which is capable of remote-controlling the apparatus is also provided. A microphone is provided on the controlling device, with the audio signal generated by the microphone being received by one of said plurality of audio signal receiving devices. The method includes the steps of:

electrically connecting one of the plurality of audio signal receiving devices with the apparatus;

temporarily storing data of the audio signal received by the connected one of the plurality of audio signal receiving devices; and recording the stored data onto the recording medium.

According to a further aspect of the invention, there is provided an externally controllable recording/reproducing apparatus capable of recording audio/video signals onto a recording medium. The apparatus includes:

a plurality of audio/video signal receiving devices for receiving the audio/video signal, at least one of the plurality of audio/video signal receiving devices receiving the audio/video signal from external equipment.

a select signal receiving device for receiving a select signal from the external equipment is provided.

an audio/video signal recording device is provided for recording the audio/video signal which is received by one of the plurality of audio/video signal receiving devices, one of the plurality of audio/video signal receiving devices being connected with the audio/video signal recording means when the audio signal is recorded.

a control device is also provided for electrically connecting one of plurality of the audio/video signal receiving devices with the audio/video signal recording means based upon the selected signal received by the selected signal receiving devices.

According to a still further aspect of the invention, there is provided a remote-controller for an audio/video recording/reproducing apparatus, with at least one external audio/video signal generating device connectable to the recording/reproducing apparatus. The remote-controller includes:

a built-in audio/video signal generating device for generating an audio/video signal and for outputting it to the recording/reproducing apparatus; and selected device for generating a selected signal is provided for selecting one of the plurality of audio/video signal generating devices including the at-least-one external audio/video signal generating devices and the built-in audio/video signal generating device.

DESCRIPTION OF THE EMBODIMENTS

Figure 1:
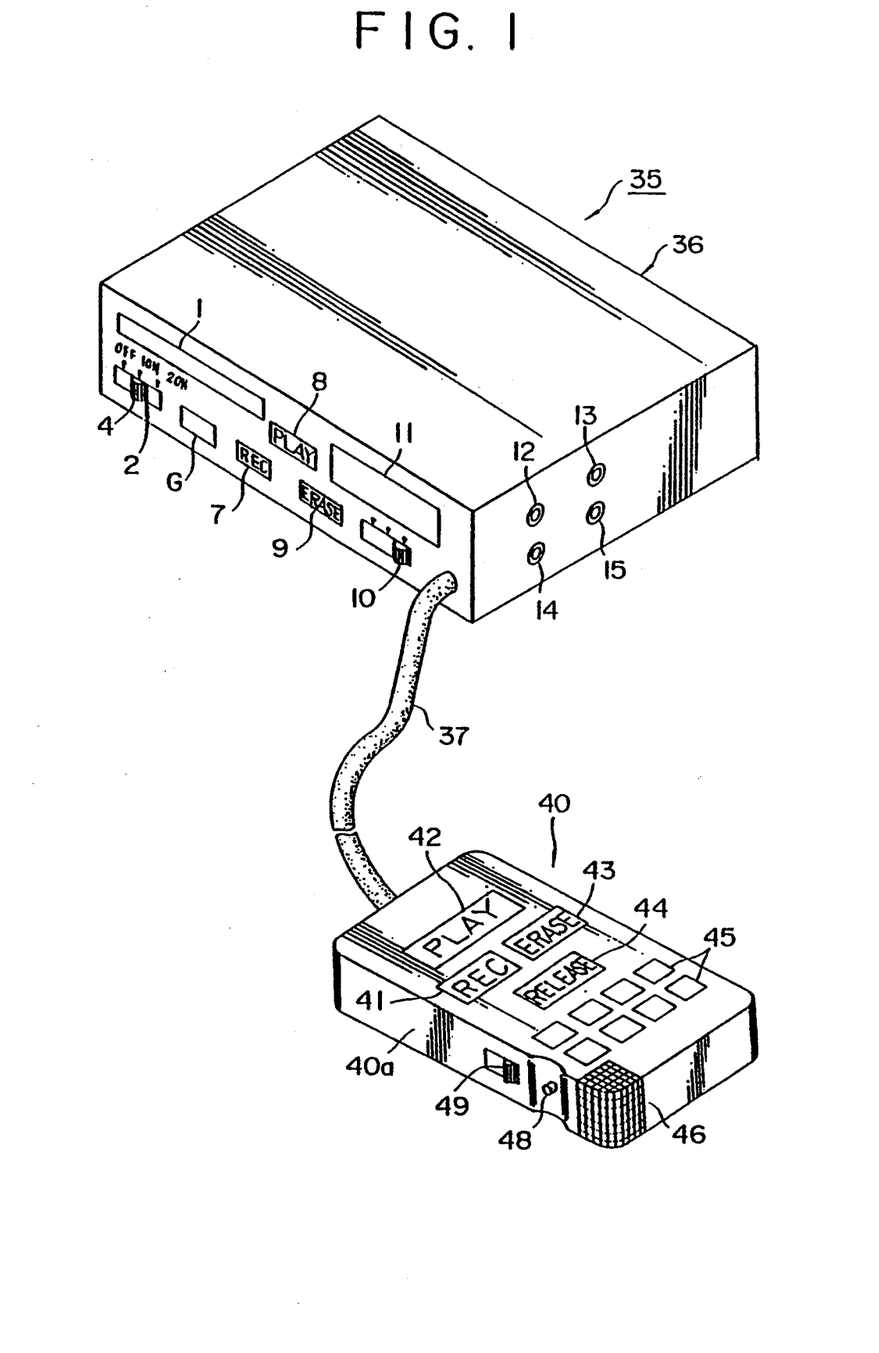
FIG. 1 is a perspective view of a recording/reproducing apparatus embodying the present invention.
Figure 2:
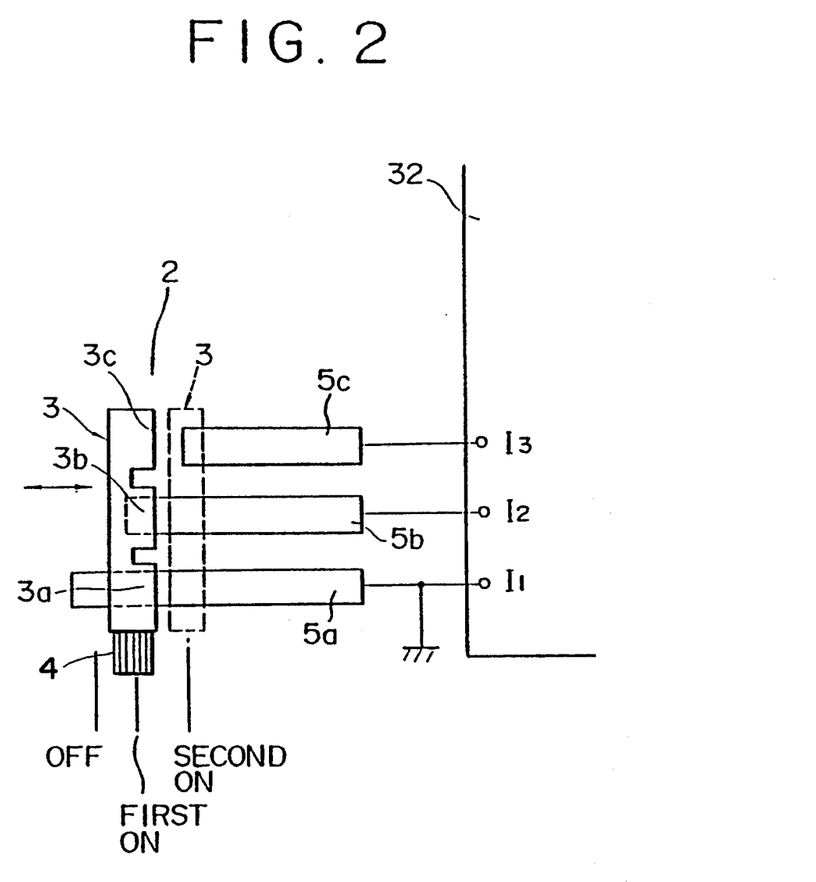
FIG. 2 is a conceptual diagram illustrating the arrangement of a power supply switch.

FIG. 1 is a perspective view of a recording/reproducing apparatus 35 embodying the present invention. In FIG. 1, a main apparatus 36 of the recording/playback apparatus 35 is formed with a disk inserting slit 1 and a power supply switch 2. The power supply switch 2 is arranged so that, as shown in FIG. 2, a movable contact 3 having three slide elements 3a, 3b, and 3c is moved to be contacted with stationary elements 5a, 5b, and 5c, respectively, as a protruded portion 4 moves in the direction of an arrow.

When the protruded portion 4 is located at an OFF position, only the slide element 3a comes in contact with the stationary element 5a. When the protruded portion 4 is located at a first ON position, the slide elements 3a, 3b come in contact with the respective stationary elements 5a, 5b as shown in FIG. 2, so that the stationary elements 5a, 5b are electrically connected. Further, when the protruded portion 4 is located at a second ON position, the slide elements 3a, 3b, and 3c come in contact with the respective stationary elements 5a, 5b, and 5c as shown by a dotted line, so that the stationary elements 5a, 5b, and 5c are electrically connected.

FIG. 1 further shows a recording switch 7 for preparing the commencement of recording, a play switch 8 for preparing the commencement of playback, an erasure switch 9 for preparing the commencement of erasure, an execute switch G for starting either recording, playback or erasure, and a select switch 10 for selecting a recording mode. With this select switch 10, either a video mode for recording only video signals, an audio mode for recording only audio signals, or an audio and video mode for recording both audio and video signals is selected. Furthermore, a display 11 for displaying each mode, a video signal input terminal 12, an audio signal input terminal 13, a video signal output terminal 14, and audio output terminal 15 are shown.

A remote controller 40 is connected via a signal cable 37 to the main apparatus 36. On the surface of the remote controller 40, are provided a switch 41 for preparing the commencement of recording, a switch 42 for preparing the commencement of playback, a switch 43 for preparing the commencement of erasure, a switch 44 for starting either recording, playback or erasure, and switches 45 for instructing other operations.

Moreover, a microphone 46 is installed on one end side of the remote controller 40, with the signal cable 37 being positioned on the opposite side. A storing switch 48 for controlling an audio signal storing process (described later) and a changeover switch 49 are provided on one side 40a where the microphone 46 is installed. The changeover switch 49 is used to switch the connection between the microphone 46 and an external microphone (an external audio source, not shown) to the main apparatus 36. When the sound (voice) picked up by the microphone is recorded, the changeover switch 49 is located at the ON position. When the voice picked up by the external microphone is recorded, the changeover switch 49 is located at the OFF position. In other words, one of the microphone 46 and the external microphone (external audio source) is chosen and the sound is recorded via the microphone thus chosen.

Figure 3:
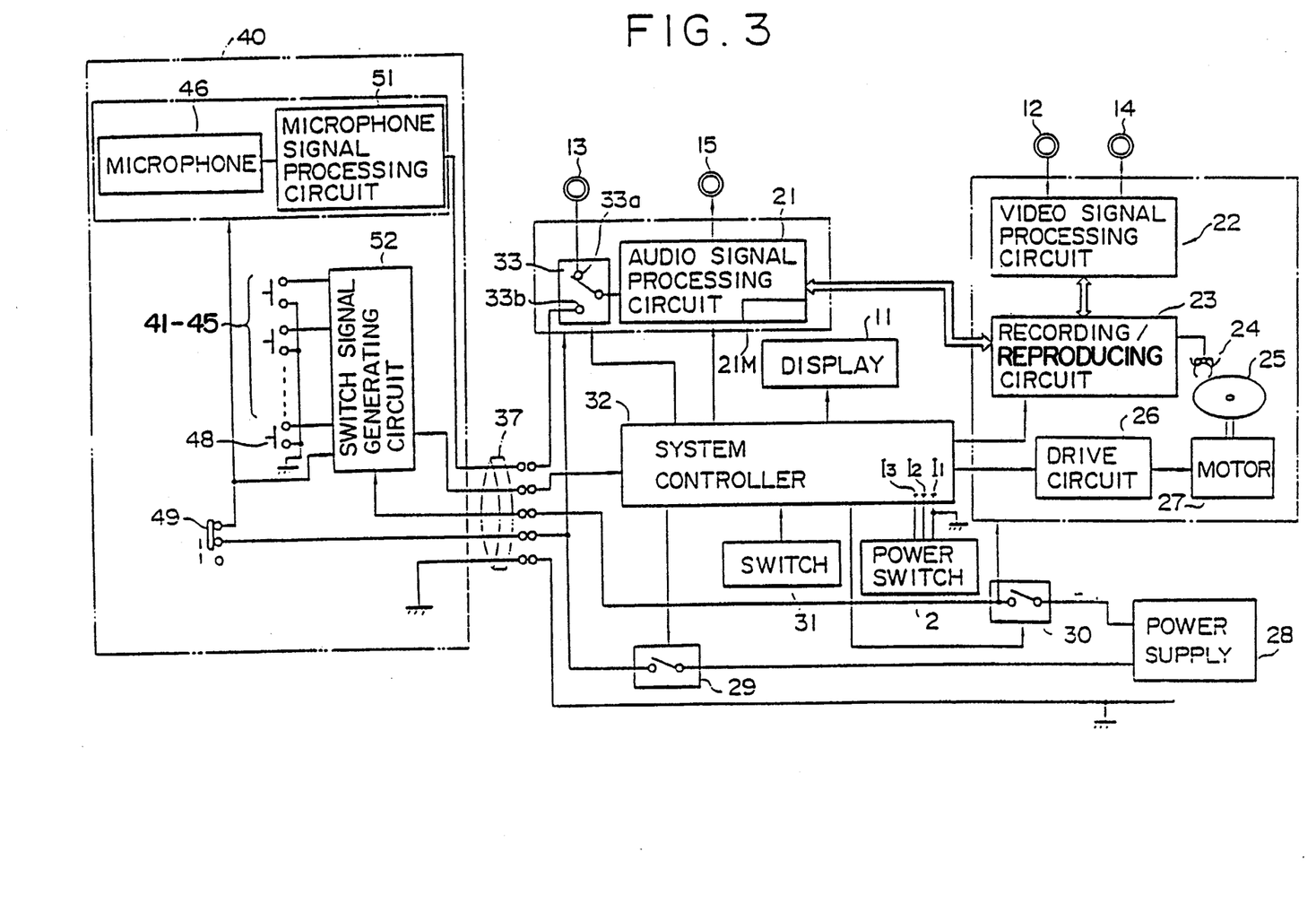
FIG. 3 is a block diagram illustrating a signal processing system configuration of the recording/reproducing apparatus.

FIG. 3 is a block diagram illustrating a signal processing system configuration of the recording/reproducing apparatus. The signal processing system comprises an audio signal processing circuit 21 for demodulating an emphasized or reproduced audio signal, a video signal processing circuit 22 for processing a video signal for recording or demodulating a reproduced video signal, and a recording/reproducing circuit 23 for recording both the audio signal produced by the audio signal processing circuit 21 and the video signal produced by the video signal processing circuit 22 onto a magnetic disk 25 via a magnetic head 24, and reproducing the video and audio signals by reading from the magnetic head 24.

The signal processing system further comprises a drive circuit 26 for driving a motor 27 to rotate the magnetic disk 25 and a power supply 28 such as a dry cell battery, a switch circuit 29 is provided for supplying the power of the power supply 28 to the audio signal processing circuit 21; a switch circuit 30 is provided for supplying the power of the power supply 28 to the video signal processing circuit 22, the recording/reproducing circuit 23, the drive circuit 26 and the like; and a group of switches 31 are provided including the record standby switch 7, the play standby switch 8, the erasure standby switch 9 and the like, and a changeover switch 33 for switching the audio source between the microphone 46 and the external microphone (not shown).

A system controller 32 comprising a microcomputer and the like is provided for controlling the audio signal processing circuit 21, the recording/reproducing circuit 23, the drive circuit and the like to record the audio and image signals on the magnetic disk 25 or to reproduce the image and audio signals recorded on the magnetic disk 25.

The system controller 32 has input terminals $I_1$, $I_2$, $I_3$, which are connected to the respective stationary contacts 5a, 5b, and 5c of the power switch 2, the stationary contact 5a being grounded. The system controller 32 turns off the switch circuits 29, 30 when only the input terminal $I_1$ remains at the ground potential, turns on the switch circuit 30 when the input terminal $I_2$ is set to the ground potential, and turns on the switch circuit 29 when the input terminal $I_3$ is set to the ground potential.

Moreover, the system controller 32 receives each of the command signals produced by a switch signal generating circuit (transmitting circuit) 52 as described later and performs the recording/reproducing operation, switching of contacts 33a, 33b of the switch circuit 33 and other similar operations.

In FIG. 3, a microphone signal processing circuit 51 is used for processing the signal produced from the microphone 46, and the switch signal generating circuit 52 is used for producing command signals corresponding to the command for each switch.

When the protruded portion 4 of the power supply switch 2 is located at the OFF position, only the stationary contact 5a is set to the ground potential. Accordingly, the switch circuits 29, 30 remain turned off by the system controller 32, so that the power of the power supply 28 is not supplied to any circuit.

When the protruded portion 4 is located at the first ON position, the stationary contacts 5a, and 5b are electrically connected as shown In FIG. 2 and the input terminal $I_2$ of the system controller 32 is set to the ground potential. Consequently, the switch circuit 30 is turned on by the system controller 32 and the power of the power supply 28 is supplied to the video signal processing circuit 22, the recording/reproducing circuit 23, the drive circuit 26 and other similar circuitry. In other words, the power is supplied to all of the circuits other than the audio signal processing circuit 21, whereby only the video signal is recorded or reproduced.

Since the power is also supplied to the switch signal generating circuit 52 of the remote controller 40, recording and reproducing can be remote-controlled.

When the protruded portion 4 is located at the second ON position, the stationary contacts 5a, 5b, and 5c are all electrically connected as shown by the dotted line of FIG. 2 so that the input terminal $I_3$ of the system controller 32, as well is set to the ground potential. The switch circuit 29 is also turned on by the system controller 32 and thereby the power of the power supply 28 is supplied to the audio signal processing circuit 21. Thus, recording/reproducing of audio signals (i.e., voice) can be performed.

Since the power is also supplied to the switch signal generating circuit 52 of the remote controller 40 at this time, the remote control operation is possible.

When the changeover switch 49 of the remote controller 40 is located at the ON position, a command signal for closing the contact 33b of the switch circuit 33 is produced from the switch signal generating circuit 52. On receiving the command signal, the system controller 32 disconnects the contact 33a and connects the contact 33b of the switch circuit 33. As a result, the audio signal produced from the microphone 46 can be inputted via the microphone signal processing circuit 51 to the audio signal processing circuit 21. Then the audio signal is stored in the memory 21M in the audio signal processing circuit 21 until the memory 21M becomes full or the switch 44 (FIG. 1) is turned on.

When the changeover switch 49 of the remote control 40 is moved to the OFF position, the system controller 32 disconnects the contact 33b of the switch circuit 33 and connects the contact 33a, and the audio signal applied from the audio signal input terminal 13 can be inputted to the audio signal processing circuit 21. The audio signal from the external microphone (not shown) or audio source is stored in the memory 21M in the audio signal processing circuit 21 until the memory 21M becomes full or the switch 44 (FIG. 1) is turned on.

By operating only the changeover switch 49 provided on the remote controller 40 in this way, the microphone 46 installed in the remote controller 40 or the external microphone to be connected to the main apparatus 36 is selected, and the audio signal is stored in the memory 21M of the audio signal processing circuit 21. The operation of this apparatus is therefore extremely convenient and at the same time facilitates the recording of sounds from different sources. Since the remote controller 40 is equipped with the microphone 46, moreover, it simplifies the assortment of peripheral components to be connected to the main body 36. With the switch provided on the remote controller 40, further, the operation of the remote controller 40 and the microphone 46 can be implemented to result in improved operability.

As the microphone 46 is fitted to the opposite side of the remote controller 40 than the side which the signal cable 37 is attached, the signal cable 37 will not act as an obstruction when the microphone 46 is directed to a voice source. Further, since the storing switch 48 is provided on the same side of the remote controller 40 and in the vicinity of the microphone 46, it is easy to operate the storing switch 48 when the microphone 46 is directed to the voice source.

Since the remote controller 40 and the main body 36 are connected through the signal cable 37, a transmitter and a receiver for transmitting the audio signal obtained through the microphone 46 to the main body 36 by radio are not required.

Figures 4, 4A:
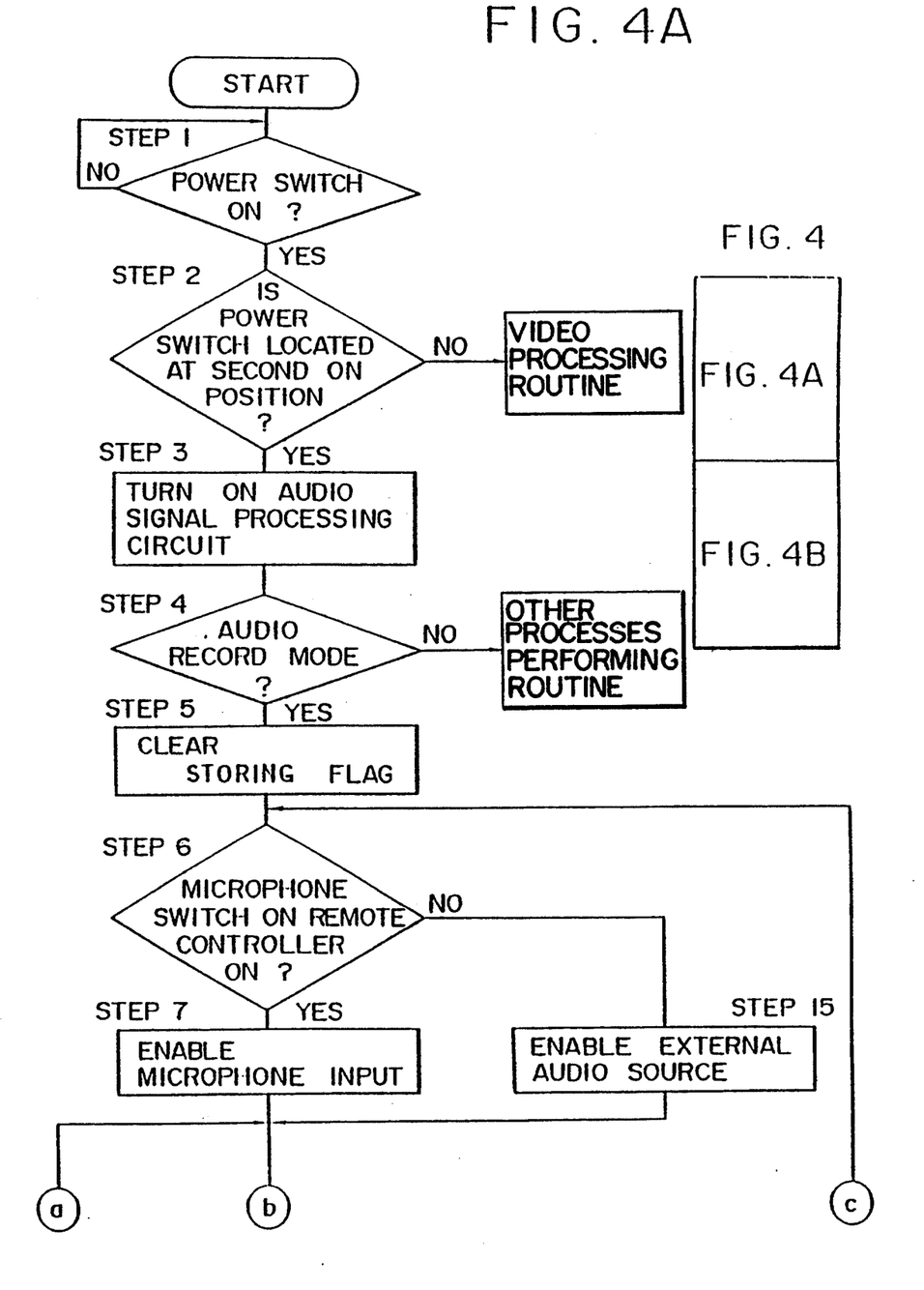
FIGS. 4A and 4B show a flowchart illustrating the operation of a system controller.
Figure 4B:
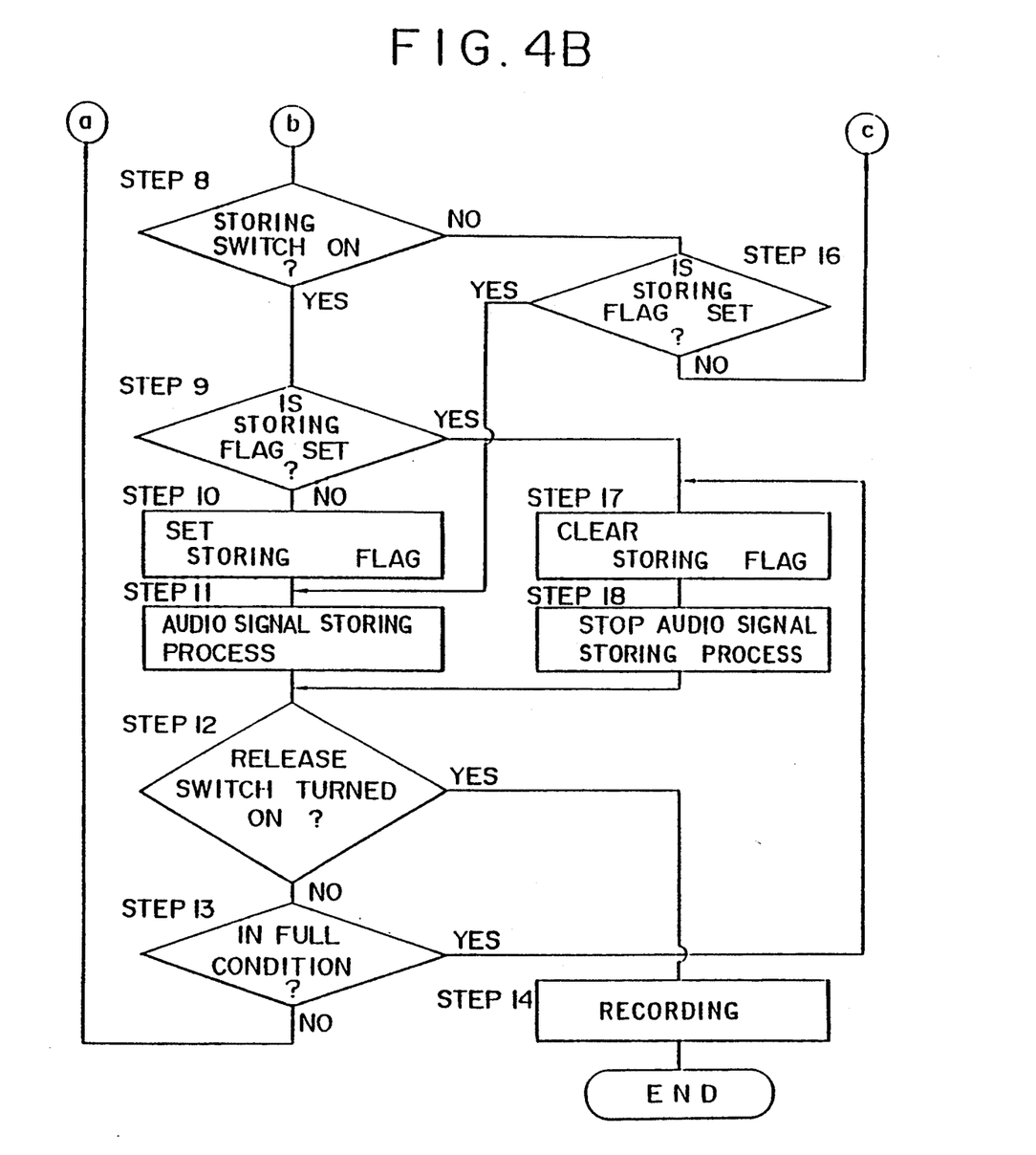

FIGS. 4A and 4B show a flowchart illustrating the operation of the system controller 32.

In Step 1, a decision is made on whether the power supply switch 2 has been turned on or not. If NO, the operation returns to Step 1. If YES, Step 2 is followed. In Step 2, a decision is made on whether the protruded portion 4 of the power supply switch 2 has been located at the second ON position. If NO, the protruded portion 4 is determined to be located at the first ON position and the video processing routine is followed thereafter. In the video processing routine, the audio signal processing circuit 21 is not turned on. If YES in Step 2, power is supplied to all the circuits 22, 23, etc., including the audio signal processing circuit 21 as the switch circuits 29, 30 being turned on.

In Step 4, a decision is made on whether the audio signal processing is required or not. In other words, if the audio mode or the audio and video mode is selected by the select switch 10, an audio record mode has been established in Step 4 and the process goes to Step 5. In this audio record mode, the audio signal is recorded by itself or along with the video signal. If the answer is NO in Step 4, a routine for performing other processes, such as reproducing process, or an erasure process, is followed. If the answer is YES in Step 4, a storing flag is cleared (initialized) in Step 5 and a determination is made on which one of the microphone 46 and an external audio source (microphone) is to be utilized for obtaining the audio signal. If the external audio source (microphone) is selected, the contact 33a of the switch circuit 33 is connected (Step 15). If microphone 46 is selected, the contact 33b of the switch circuit 33 is connected (Step 7).

In Step 8, a determination is made on whether the storing switch 48 has been turned on. If the answer is NO, the storing flag is set (Step 16) and a determination is made whether the process returns to Step 6. If YES, Step 9 is performed. In Step 9, a determination is made on whether the storing flag has been set. If YES, the storing flag is cleared and the storing operation is halted (Steps 17, 18). In Step 9, if it is determined NO, the storing flag is set, the storing process is performed (Steps 10, 11 ), and Step 12 is followed.

In Step 12, a determination is made on whether the release switch 44 has been turned on. If YES, audio signal is recorded and the operation terminates (Step 14). If the answer is NO in step 12, Step 13 is followed. In Step 13, a decision is made on whether the memory 21M of the audio processing circuit 21 is in full condition with reference to the address of the memory 21M corresponding to the stored audio signal data. If NO, the process returns to Step 8. If the answer is YES, Step 17 is followed and the storing process is halted (Step 18).

When the storing process in which the audio signal is stored in the memory 21M of the audio signal processing circuit 21 is not executed, the storing flag is set OFF. If the storing switch 48 is OFF, the process loops through Steps 6, 8, 7, 16 and back to Step 6. If the storing switch 48 is changed to be turned ON, the process goes through Steps 8, 9, 10, 11, 12, 13 and back to Step 8. In this case, when the process comes back to Step 8, if the storing switch 48 is not turned on, the process loops through Steps 8, 16, 11, 12, 13 and back to Step 8. As the process goes through this storing loop, the audio signal is stored in the memory 21M of the audio signal processing circuit 21.

If the release switch 44 is turned on (step 12) in the storing loop described above, the stored signal in the memory 21M of the audio processing circuit 21 is recorded on the magnetic disk 25 via the magnetic head 24 by the recording/reproducing circuit. However, if the release switch 44 is not ON, when the memory 21M reaches the full condition, that is, a predetermined amount of the data of the audio signal has been stored during the storing loop, the storing flag is cleared and the storing process is terminated. Then, the process loops through Steps 17, 18, 12, and 8 until the release switch 44 is turned on.

On the other hand, if the storing switch 48 (as determined at step 8) is not turned on during the storing process, the storing operation is terminated, and the process returns to the loop through Steps 16, 6, 7 or 15, and 8. If the store switch is turned on again, the storing process restarts. In this case, the audio signal is stored sequentially to the data which has been stored during the preceding storing process(es).

As set forth above, the remote control is fitted with the directional microphone and the changeover switch (for selecting either directional microphone or voice input device) and is properly connected to the apparatus for causing the voice picked up by the directional microphone or voice input device to be recorded according to the present invention. As a result, the microphone installed in the remote control can be switched over to the voice input device only by operating the changeover switch provided on the remote control. This apparatus is therefore extremely convenient and at the same time facilitates the recording of sounds having different characteristics. Since the microphone is installed in the remote control, the operation of the remote control and the microphone can be carried out simultaneously by operating the switch provided for the remote control. The operability of the apparatus is thus improved.

What is claimed is:

1. A recording/reproducing system comprising an externally controllable recording/reproducing apparatus capable of recording an inputted audio signal onto a recording medium, and a remote controller adapted for controlling said recording/reproducing apparatus, said system comprising:
   a remote controller comprising means capable of remotely controlling at least a recording operation of said recording/reproducing apparatus;
   means, provided on said remote controller, for picking up sound waves and converting the sound waves into an audio signal adapted to be stored;
   said recording/reproducing apparatus comprising:
   manually actuatable power switch means for controlling a power supply for said recording/reproducing system;
   first audio signal receiving means for receiving the audio signal produced by said picking up and converting means; and
   second audio signal receiving means for receiving an audio signal other than the audio signal which is produced by said picking up and converting means;
   said remote controller further comprising selection means for selecting one of said first and second audio signal receiving means; and
   said recording/reproducing apparatus further comprising control means for electrically connecting the one of said first and second audio signal receiving means, which is selected by said selection means, to said apparatus.

2. The recording/reproducing apparatus according to claim 1, wherein said controller is electrically connected with said apparatus by means of a cable member, and wherein said microphone is provided on a portion of said controller opposite to the portion to which one end of said cable member is fitted.

3. The recording/reproducing apparatus according to claim 1, further comprising memory means for temporarily storing data of the audio signal received by one of said first and second audio signal receiving means.

4. The recording/reproducing apparatus according to claim 3, further comprising store switch means for instructing said apparatus to start storing one of the audio signals, said store switch means being provided on said controller, and wherein said control means starts storing the audio signal received by one of said first and second audio signal receiving means.

5. The recording/reproducing apparatus according to claim 4, wherein if said store switch means is operated when the audio signal is being stored, said control means stops storing the data of the audio signal into said memory means.

6. The recording/reproducing apparatus according to claim 5, wherein said store switch means is provided adjacent to said microphone on said controller.

7. The recording/reproducing apparatus according to claim 5, wherein said control means stops storing the data of the audio signal in said memory means when a predetermined amount of the data of the audio signal has been stored in said memory means.

8. The recording/reproducing apparatus according to claim 5, further comprising record switch means provided on said controller for instructing the recording operation, and wherein said control means records the data of the audio signal stored in said memory means on said recording medium.

9. The recording/reproducing apparatus according to claim 8, further comprising recording means for transmitting the data stored in said memory means to said recording medium when said record switch means is operated.

10. A recording/reproducing system according to claim 1, wherein said picking up and converting means comprises a microphone.

11. The recording/reproducing system according to claim 1, said second audio signal receiving means comprising means for receiving an audio signal from a source other than said picking up and converting means.

12. The recording/reproducing system according to claim 1, further comprising alternately usable switches on each of said remote controller and said apparatus for controlling a recording operation of said system.

13. A recording/reproducing system comprising an externally controllable apparatus capable of recording an inputted audio signal onto a recording medium, and a remote controller adapted for controlling said apparatus, said system comprising:

means, provided on said remote controller for picking up sound waves and converting the sound waves into an audio signal adapted to be stored;

manually actuatable means, on said apparatus for controlling a supply of power for said recording-/reproducing system;

said apparatus comprising first audio signal receiving means for receiving the audio signal produced by said picking up and converting means and second audio signal receiving means for receiving an audio signal other than said audio signal which is produced by said picking up and converting means;

said remote controller further comprising selection means for selecting one of said first and second audio signal receiving means to be electrically connected to said apparatus.

14. The recording system according to claim 13, said remote controller further comprising signal generating means for generating a command signal for controlling an operation of said apparatus.

15. The recording system according to claim 13, further comprising means for electrically connecting the one of said first and second audio signal receiving means, that is selected by said selection means, to said apparatus.

16. The recording/reproducing system according to claim 13, said second audio signal receiving means comprising means for receiving an audio signal from a source other than said picking up and converting means.

17. The recording/reproducing system according to claim 13, further comprising alternately usable switches on each of said remote controller and said apparatus for controlling a recording operation of said system.

18. An externally controllable recording/reproducing apparatus capable of recording audio/video signals onto a recording medium, said apparatus comprising:

a plurality of audio/video signal receiving means for receiving audio/video signals, at least one of said plurality of audio/video signal receiving means receiving an audio/video signal from an external equipment;

select signal receiving means for receiving a select signal from said external equipment;

audio/video signal recording means for recording the audio/video signal which is received by one of said plurality of audio/video signal receiving means, said one of said plurality of audio/video signal receiving means being connected with said audio/video signal recording means when the audio signal is recorded;

control means for electrically connecting said one of said plurality of audio/video signal receiving means with said audio/video signal recording means based upon the select signal received by said select signal receiving means; and audio signal processing means and video signal processing means, wherein said apparatus comprises switch means having two operative positions, one of said audio signal processing means and said video signal processing means being actuated if said switch means is located at one of said operative positions, both said audio signal processing means and said video signal processing means being actuated if said switch means is located at the other of said operative positions.

19. The externally controllable recording/reproducing apparatus according to claim 18, further comprising command signal receiving means for receiving a command signal from said signal external equipment, wherein said control means controls said recording/reproducing apparatus based on the command signal received by said command signal receiving means.

20. The externally controllable recording/reproducing apparatus according to claim 18, further comprising memory means for temporarily storing data of the audio/video signals received by said one of said plurality of audio/video signal receiving means.

* * * * *

UNITED STATES PATENT AND TRADEMARK OFFICE
CERTIFICATE OF CORRECTION

PATENT NO. : 5,337,292
DATED : August 9, 1994
INVENTOR(S) : Harumi AOKI

It is certified that error appears in the above-indentified patent and that said Letters Patent is hereby corrected as shown below:

On the cover sheet, section [56], line 6 of the section titled <u>Foreign Patent Documents</u>, change "1/0380" to ---1/1980---.

Signed and Sealed this

Twenty-first Day of March, 1995

Attest:

BRUCE LEHMAN

*Attesting Officer*   *Commissioner of Patents and Trademarks*